United States Patent [19]

Tjahjadi

[11] Patent Number: 5,040,192

[45] Date of Patent: Aug. 13, 1991

[54] METHOD AND APPARATUS FOR OPTIMALLY AUTOCORRELATING AN FSK SIGNAL

[75] Inventor: Taruna Tjahjadi, Duluth, Ga.

[73] Assignee: Hayes Microcomputer Products, Inc., Norcross, Ga.

[21] Appl. No.: 475,940

[22] Filed: Feb. 6, 1990

[51] Int. Cl.[5] .......................... H03D 3/00; H03D 5/00
[52] U.S. Cl. ...................... 375/80; 329/300;
329/304; 375/83; 375/88; 375/9; 455/142
[58] Field of Search ........................ 375/80, 82, 83, 88,
375/9; 329/300, 301, 303, 304, 327, 336, 372;
364/724.1; 455/142, 143

[56] References Cited

U.S. PATENT DOCUMENTS

| | | | |
|---|---|---|---|
| 3,387,220 | 6/1968 | Lender | 375/80 |
| 4,486,716 | 12/1984 | LeFloch | 375/82 |
| 4,716,376 | 12/1987 | Daudelin | 375/88 |
| 4,750,214 | 6/1988 | Hart et al. | 375/80 |

Primary Examiner—Benedict V. Safourek
Attorney, Agent, or Firm—Jones, Askew & Lunsford

[57] ABSTRACT

An autocorrelator for FSK signals. An FSK signal, incoming on a telephone line is filtered by a bandpass filter (13) and sampled by an A/D converter (14). A sample clock (15) provides a fixed sampling frequency, FS. A first interpolating filter (20B) provides selectable delays which are non-integer multiples of 1/FS, and an integer delay (25) provides selectable delays which are integer multiples of 1/FS. The delayed signals are multiplied by a multiplier (26) and then filtered by a low pass filter (27) to provide a filtered autocorrelated signal. A second interpolating filter (20A) provides for reduced jitter in the baud timing by increasing the number of samples provided to the decision logic (23). The decision logic (23) provides the decoded data output.

71 Claims, 2 Drawing Sheets

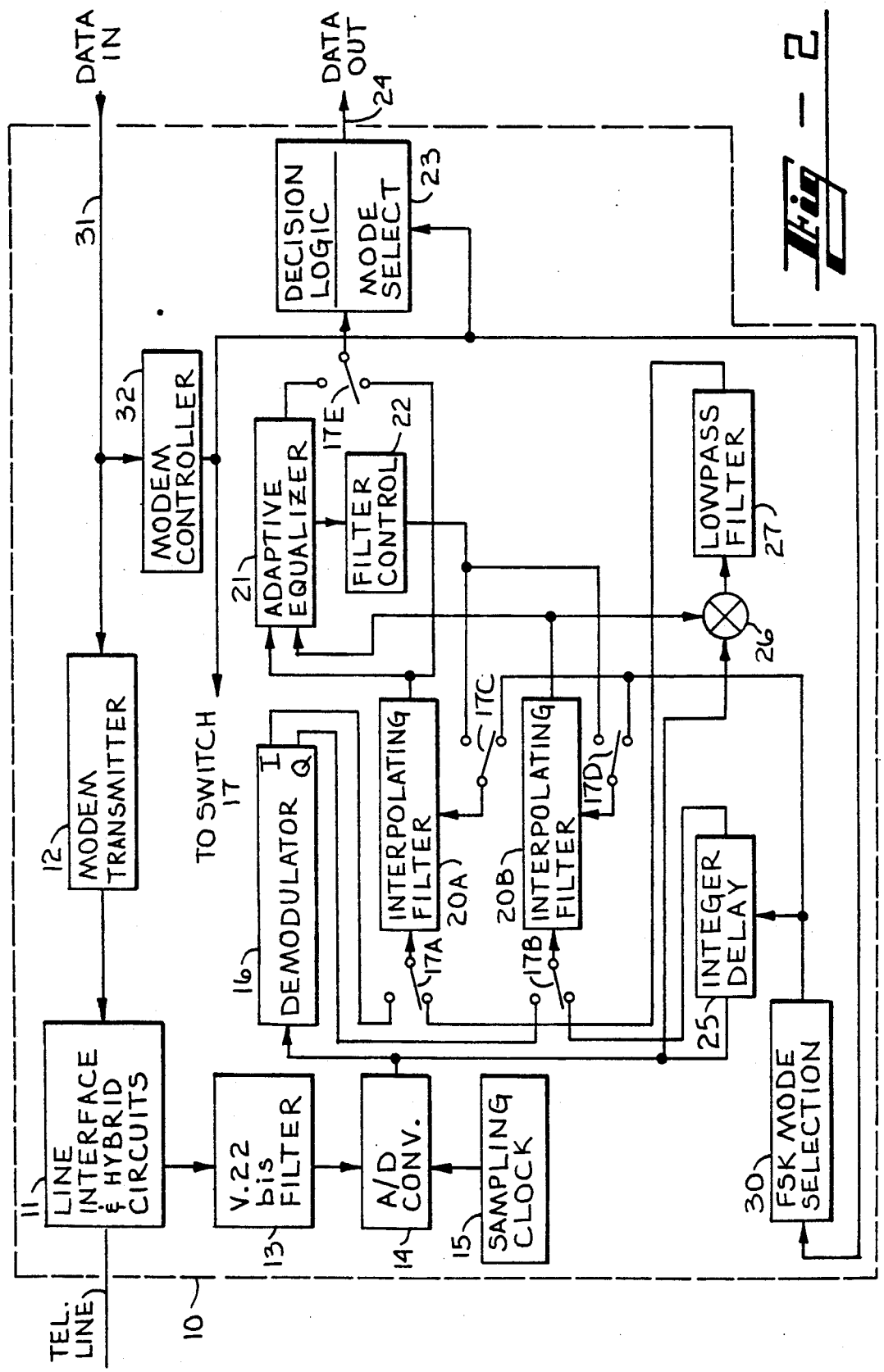

METHOD AND APPARATUS FOR OPTIMALLY AUTOCORRELATING AN FSK SIGNAL

TECHNICAL FIELD

The present invention relates to the reception of frequency shift keyed (FSK) signals and, more particularly, to a method and apparatus for optimizing the autocorrelation of a sampled FSK signal by using delays which are integer and non-integer multiples of the period of the sampling frequency.

BACKGROUND OF THE INVENTION

The use of autocorrelation to detect an FSK signal is well known. In autocorrelation, the input signal is delayed by a predetermined delay time to produce a delayed input signal. The delayed input signal is then multiplied by the input signal and the resulting product is low pass filtered to provide an output signal.

An output signal exceeding a first value would then be, for example, considered to represent a mark signal, an output signal less than a second value would be considered to represent a space signal, and an output signal between these two values would be ignored or treated as undefined. For convenience, the second value is preferably the negative of the first value so that the autocorrelated mark and space signals are symmetrical about zero. This provides for convenience in detection in that the same threshold value is used to distinguish a valid signal (mark or space) from an invalid or undefined signal. If the signal is valid (above the threshold) then the sign of the signal identifies the signal as a mark signal or a space signal. The delay time is preferably selected so as to maximize the difference between the output signal for the mark signal frequency and the output signal for the space signal frequency. Maximizing this difference minimizes the likelihood that a mark will be mistaken for a space, and vice versa.

In digital systems the input signal is sampled and converted at a sampling frequency to provide a sampled signal. The sampled signal is delayed by "shifting" the signal through a memory, generally by updating a pointer at the sampling frequency, and the delayed (shifted) sampled signal and the current sampled signal are multiplied in a microprocessor to provide an autocorrelated sampled signal. This autocorrelated sampled signal is then digitally low pass filtered. The microprocessor then determines whether the filtered signal represents a mark or a space.

The sampled signal is shifted through the memory at the sampling frequency so the delay time provided by the memory is an integer multiple of the period of the sampling frequency. Therefore, in order to produce the desired delay time, the sampling frequency is adjusted so that an integer multiple of the period of the sampling frequency is equal to the desired delay time.

However, in systems which use a fixed sampling frequency the delay times that are available are integer multiples of the period of this fixed frequency. These integer multiples typically provide delay times which produce an acceptable, but not optimal, difference between the autocorrelated mark signal and the autocorrelated space signal.

Therefore, there is a need for a method and an apparatus for producing an optimal delay time for autocorrelating an FSK signal when using a fixed sampling frequency so as to maximize the difference between the autocorrelated mark signal and the autocorrelated space signal.

A typical modem will accommodate data tranfers using FSK, phase shift keying (PSK), and phase and amplitude modulation (PAM). In order to reduce the effects of noise that may be present on a telephone line to which the modem is connected the modem will typically employ a bandpass filter, such as a V.22bis bandpass filter. This filter is designed to sharply attenuate signals which are outside the nominal bandwidth of the PSK or PAM signal. Different carrier frequencies are used for FSK transmission than for PSK/PAM transmission. This V.22bis filter is designed for PSK and PAM signals, and not for FSK signals, so the mark frequency signal and space frequency signal are not attenuated by the same amount. This distorts the autocorrelation function and reduces the difference between the filtered autocorrelated output signal for the mark signal and the filtered autocorrelated output signal for the space signal. The distortion and the reduction in the difference tend to increase the likelihood of an error in the recovered data.

Therefore, there is a need for a method and an apparatus for autocorrelating an FSK signal in a manner which maximizes the difference between the autocorrelated mark signal and the autocorrelated space signal, and makes the autocorrelated signals symmetrical about zero, even when the incoming amplitudes of these two signals are caused to be different by an input filter.

SUMMARY OF THE INVENTION

The present invention provides a method and an apparatus for autocorrelating an FSK signal in a manner which optimizes the difference between the autocorrelated output for the mark signal frequency and the autocorrelated output for the space signal frequency when a fixed sampling frequency is used. Furthermore, the present invention provides a method and an apparatus for optimally autocorrelating an FSK signal by maximizing this difference and making the autocorrelated signals symmetrical about zero even when the FSK signal is filtered by a bandpass filter which does not provide the same attenuation at the mark and space frequencies.

A PSK/PAM modem which uses a fixed sampling clock frequency may use interpolating filters so as to compensate for the difference between its clocks and the clocks in the remote modem. These interpolating filters provide a device whereby the input signal at two sampling points may be interpolated to provide a signal which corresponds to the input signal at a desired time point between these two sampling points. In effect, the interpolating filter is a delay device which provides a sample point which is offset from the other sample points by a delay time which is a fraction of the period of the sampling frequency. The present invention utilizes the interpolating filters, which are already present in the PSK/PAM modem, to provide delay times which are non-integer multiples of the period of the sampling frequency. The present invention uses these non-integer delay times, along with integer delay times, to provide a net delay time which is optimal for autocorrelating an input FSK signal so as to maximize the difference between the autocorrelated mark signal and the autocorrelated space signal.

Furthermore, the present invention provides for selecting the net delay time so as to compensate for the effects of an input filter, such as a V.22bis filter, so that this difference is still maximized and the autocorrelated signals are symmetrical about zero.

Therefore, it is an object and advantage of the present invention to provide non-integer delay times for autocorrelating an FSK signal so as to maximize the difference between the autocorrelated mark signal and the autocorrelated space signal.

It is another object and advantage of the present invention to provide a net delay time which compensates for the effects of an input filter so that this difference is still maximized and the autocorrelated signals are symmetrical about zero.

BRIEF DESCRIPTION OF THE DRAWING

FIG. 2 is a block diagram of an alternative embodiment of the present invention.

DETAILED DESCRIPTION

Figure 1:
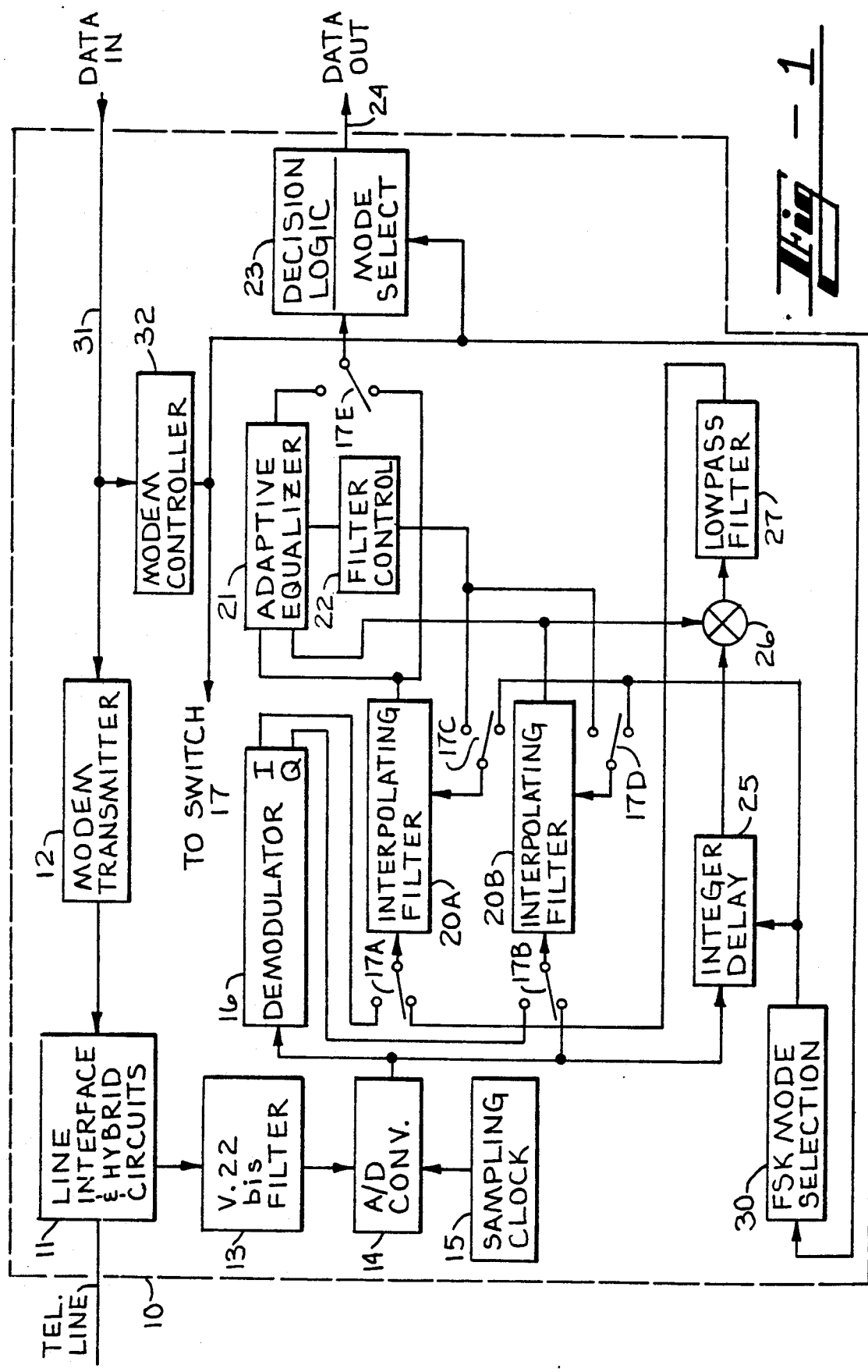
FIG. 1 is a block diagram of the preferred embodiment of the present invention in its preferred environment.

FIG. 1 is a block diagram of the preferred embodiment of the present invention in its preferred environment, a modem. Modem 10 is designed to accommodate FSK, PSK, and PAM data transfers between a telephone line and an external device (not shown) such as a computer. Modem 10 receives data from the external device via signal path 31, modem transmitter 12 generates a signal suitable for transmission over the telephone line, and line interface and hybrid circuits 11 couple the output of modem transmitter 12 to the telephone line.

In the preferred embodiment modem 10 has an online state and a command state. As is well known, the online state of a modem is used for data transfer operations and the command state is used to configure the modem operating parameters (FSK/PSK/PAM mode, number of bits, parity, synchronous/asynchronous operation, etc.). Modem controller 32 monitors the signals on line 31 for instructions to enter the command state, configure the modem parameters, and enter the online state. Modem controller 32 sets switches 17 in accordance with the mode (FSK,PSK/PAM) of operation selected, causes decision logic 23 to be configured for FSK, PSK or PAM operation, as appropriate, and advises FSK mode selection circuit 30 of the FSK mode selected if appropriate. Switches 17 are shown set for FSK modem operation. Construction and operation of a modem controller, such as modem controller 32, are well known.

For receiving, line interface and hybrid circuits 11 separate the incoming signal on the telephone line from the outgoing signal provided by modem transmitter 12. This incoming signal is then provided to a V.22bis filter 13 which bandpass filters the incoming signal so as to reduce or eliminate noise and unwanted signals. The filtered input signal is then sampled and converted to a digital form by an analog-to-digital (A/D) converter 14. The sampling frequency, which is fixed, is set by sampling clock 15. In the preferred embodiment the sampling frequency (FS) is 9600/second.

When modem 10 is operating in the PSK or PAM modes, the output of A/D converter 14 is provided to demodulator 16. Demodulator 16, which may be a Hilbert demodulator, provides inphase (I) and quadrature phase (Q) outputs. The I and Q outputs are routed by switches 17A and 17B, respectively, to interpolating filters 20A and 20B. Interpolating filters 20 provide variable delays so as to compensate for the differences in the clocks of modem 10 and the remote modem (not shown) connected to the telephone line. The outputs of filters 20 are provided to an adaptive equalizer 21 which compensates for the bandpass characteristics of the telephone line. Equalizer 21 provides the equalized output signal, to decision logic 23 via switch 17E, at the rate of 600 symbols per second for 1200 and 2400 bps communications, and 2400 symbols per second for 4800 and 9600 bps communications. Decision logic 23 recovers the bit stream represented by the PSK or PAM signal on the telephone line and, via signal path 24, provides these bits as data out to the external device (not shown). Equalization coefficient outputs from adaptive equalizer 21 are provided to filter control 22. The output of filter control 22 is connected to the filter control inputs of interpolating filters 20 through switches 17C and 17D. Filter control 22 controls the rate at which interpolating filters 20 cycle through the different delay times that they provide. The use of interpolating filters, an adaptive equalizer, and a filter control circuit 22 to compensate for the difference between the fixed sampling clock frequency of the local modem and the clock frequency of the remote modem are described in U.S. patent application Ser. No. 419,077, filed Oct. 10, 1989, by Taruna Tjahjadi and Cynthia J. Correa, entitled "Method And Apparatus For Baud Timing Recovery", which is hereby incorporated herein by reference.

When modem 10 is operating in the FSK mode the incoming signal on the telephone line is filtered by filter 13 and sampled by A/D converter 14 at a fixed rate FS determined by the sampling clock 15. The output of A/D converter 14 is provided to integer delay circuit 25 and, through switch 17B, to interpolating filter 20B. The output of integer delay circuit 25 and the output of filter 20B are provided to a multiplier 26. The output of multiplier 26, which is an autocorrelated signal, is then provided to low pass filter 27. The filtered autocorrelated output of filter 27 is provided, by switch 17A, to a second interpolating filter 20A. Filter 20A effectively doubles the number of samples of the input signal, the reason for which is discussed below. The output of filter 20A is provided, by switch 17E, to decision logic 23 which recovers the data and provides a data output signal on signal path 24. It will be appreciated that different logic is required for the FSK, PSK and PAM modes. However, for convenience, a single decision logic block 23 is shown, with a MODE SELECT input for selecting the appropriate logic to be used for recovering the data.

The output of FSK Mode Selection circuit 30 is connected to the control input of Integer Delay circuit 25 and, via switches 17C and 17D, to the control inputs of interpolating filters 20. Delay circuit 25 provides a delay which is a selected one of a plurality of delays, each of the delays being an integer multiple of 1/FS. Interpolating filter 20B also provides a delay which is a selected one of a plurality of delays, each of the delays being a fraction of 1/FS. In the preferred embodiment filter 20B provides a delay having a value of $N/(31 \times FS)$, where N is an integer between 1 and 31.

The different FSK modes (V.21, V.23, Bell 103) use different carrier frequencies. Therefore, different delay times are required to maximize the difference between the autocorrelated mark and space signals. Modem controller 32 instructs FSK mode selection circuit 30 as to which FSK mode has been selected. Section circuit 30 then causes delay 25 and filter 20B to provide the optimum delay for the selected FSK mode, and causes filter 20A to double the number of samples provided to decision logic 23.

The use of a fixed sample clock frequency is an asynchronous data sampling technique so the incoming signal may be sampled at mark-to-space or space-to-mark transition points, which produces jitter in the baud timing. In V.23 FSK operation, the bit rate is 1200 bits per second so the jitter is noticeable if a sampling frequency of 9600 per second is used. If the sampling clock frequency is increased the effect of sampling at a transition point is reduced and the baud timing jitter is reduced. In the present invention, the sampling frequency is effectively increased to 19,200 samples per second by the use of interpolating filter 20A. Interpolating filter 20A interpolates between two adjacent sample points to provide an average sample signal and so provides to decision logic 23 a sample, the average of that sample and the next sample, the next sample, the next average, etc. Therefore, the actual sampling frequency provided by sampling clock 15 need not be adjusted. Furthermore, additional circuitry is not required to increase the effective sampling frequency because interpolating filter 20A was already present in the receiver for use in the PSK/PAM modes of operation.

For a given delay T, the autocorrelation function (RM) for the mark signal is defined as $$RM = \frac{AM}{T} \int_0^T \cos(WM(t))\cos(WM(t-T))dt,$$

and the autocorrelation function (RS) for the space signal is defined as $$RS = \frac{AS}{T} \int_0^T \cos(WS(t))\cos(WS(t-T))dt,$$

where WM and WS are the radian mark and space frequencies, respectively, and AM and AS are the amplitude of the mark and space signals, respectively. Preferably, AM=AS. For symmetry about zero, RS= −RM. The difference (D) between the autocorrelated mark and space signals is defined as $$D = RM - RS,$$

and, if symmetry about zero is obtained, then $$D = RM - (-RM) = 2RM.$$

Because the sampling clock frequency is fixed the delays provided by delay 25 will be integer multiples of the period of the sampling frequency. However, the delay required to optimize the difference between the autocorrelated signals is generally not an integer multiple of the period of the sampling frequency. By interpolating between samples interpolating filter 20B can provide delays which are non-integer multiples of the period of the sampling frequency. Therefore, in the present invention, an interpolating filter is used to implement a fractional delay (non-integer delay). In the preferred embodiment the fractional delay has a resolution of 1/31 of the period of the sampling frequency and provides a selectable delay of N/31 of the period of the sampling frequency, where N is an integer between 1 and 31. This fractional delay, when combined with the integer delay provided by delay 25, provides a net delay which maximizes the difference between the autocorrelated mark and space signals. The 1/31 resolution is not critical and was selected because the number of stages used in filter 20B to effect the PSK/PAM modes provides a 1/31 resolution.

In the preferred embodiment filter 20B and delay 25 are in parallel. Therefore, the net delay is the difference between the integer delay provided by delay 25 and the fractional delay provided by filter 20B.

However, delay 25 and interpolating filter 20B can be connected in series so that the net delay is the sum of the integer delay provided by delay 25 and the fractional delay provided by filter 20B. This alternative embodiment is shown in FIG. 2.

Returning to FIG. 1, it will be recalled that the incoming signal on the telephone line is filtered by a V.22bis filter 13. The filter characteristics preferred for V.22 operation are different from the filter characteristics preferred for V.21, V.23, and Bell 103 operation. A V.22bis filter has a bandpass at 1200 Hz or 2400 Hz, depending on whether the modem is the calling modem or the answering modem. Assume that the 1200 Hz center frequency is selected. The V.21 space frequency will be 1180 Hz, and the amplitude of the space signal (AS) will not be attenuated, but the V.21 mark frequency is 980 Hz, and the amplitude of the mark signal (AM) will be attenuated. Therefore, the autocorrelated output (RM) at the mark frequency will be decreased and the autocorrelated outputs (RM and RS) will no longer be symmetrical about zero. Filter 13 therefore has the effect of distorting the autocorrelation function. Of course, filter 13 could be switched out and an appropriate filter switched in but this would increase the cost, the size, and the number of circuits required for operation.

In the preferred embodiment, filter 13 is allowed to remain in the circuit at all times and the delays provided by delay 25 and interpolating filter 20B are selected to compensate for the effects of filter 13. Symmetry about zero for the autocorrelated mark and space signals RM and RS, respectively, is obtained by changing the net delay time T so that the more attenuated signal is enhanced and the less attenuated signal is diminished. In the preferred embodiment, the net delay time is selected to achieve symmetry about zero. By proper selection of the net delay time, symmetry about zero can often be achieved with little or no decrease in the difference D between the signals RM and RS beyond the decrease which has been caused by filter 13. Table 1 lists the preferred delay times for delay 25 and interpolating filter 20B when used in the configuration shown in FIG. 1. The values were derived empirically. It will be appreciated that different delay times, but which produce the same net delay times, will be required if the alternative embodiment of FIG. 2 is implemented.

TABLE 1

| PREFERRED DELAY TIMES | | | |
|---|---|---|---|
| FSK Mode | Integer Delay | Fractional Delay | Net Delay |
| V.23 - 1200 bps | 9 | 9/31 | 8 + 22/31 |
| V.23 - 600 bps | 9 | 26/31 | 8 + 5/31 |
| V.23 - 75 bps | 21 | 31/31 | 20 |
| V.21 - originate | 20 | 4/31 | 19 + 27/31 |
| V.21 - answer | 20 | 15/31 | 19 + 16/31 |
| Bell 103 - originate | 24 | 7/31 | 23 + 24/31 |
| Bell 103 - answer | 23 | 15/31 | 22 + 16/31 |

Note: Delay is in terms of period of sampling frequency. 9600 per second.

In the preferred embodiment, components 12, 16, 20A, 20B, 21, 22, 23, 25, 26, 27 and 30 are implemented by a microprocessor and a memory, and component 15 is implemented as a part of a gate array. In the preferred embodiment, the microprocessor is a type TMS320C25, manufactured by Texas Instruments, the memory is a 4k×16 bit 35 nsec ROM, and the V.22bis filter is a custom chip based on the SSI214 standard chip, manufactured by Silicon Systems, Inc.

From the foregoing description of the preferred embodiment, it will be appreciated that the present invention overcomes the disadvantages of the prior art and achieves the objects and advantages of the invention recited above. From the description, other embodiments will suggest themselves to those skilled in the art. Therefore, the scope of the present invention is to be limited only by the claims below.

What is claimed is:

1. An apparatus for receiving a frequency shift keyed (FSK) signal, said FSK signal comprising a first signal at a first frequency and a second signal at a second frequency comprising:
   filtering means for providing a filtered FSK signal by filtering said FSK signal said filtering means attenuating said first signal more than said second signal;
   an analog-to-digital (A/D) converter for providing a sampled signal by sampling and converting said filtered FSK signal;
   first delay means for providing a first delayed signal by delaying said sampled signal by a first delay time;
   second delay means for providing a second delayed signal by delaying said sampled signal by a second delay time;
   a multiplier for providing an autocorrelated signal by multiplying said first delayed signal by said second delayed signal;
   a low pass filter for providing a filtered autocorrelated signal by filtering said autocorrelated signal; and
   decision logic for recovering data represented by said FSK signal by decoding said filtered autocorrelated signal;
   wherein the difference between said first delay time and said second delay time optimizes recovery of data represented by said FSK signal by at least partially compensating for said filtering means.

2. The apparatus of claim 1 wherein said filtering means comprises a bandpass filter.

3. The apparatus of claim 1 wherein said filtered autocorrelated signal comprises a filtered autocorrelated first signal and a filtered autocorrelated second signal, and said difference between said first delay time and said second delay time causes said filtered autocorrelated first signal to have a value which is the negative of the value of said filtered autocorrelated second signal.

4. The apparatus of claim 1 wherein said A/D converter samples and converts said FSK signal at a fixed sampling frequency, FS.

5. The apparatus of claim 4 wherein said first delay time is an integer multiple of 1/FS.

6. The apparatus of claim 5 wherein said second delay time is a non-integer multiple of 1/FS.

7. The apparatus of claim 1 wherein at least one of said first delay means and said second delay means comprises an interpolating filter.

8. An apparatus for receiving a frequency shift keyed (FSK) signal, comprising:
   an analog-to-digital (A/D) converter for providing a sampled signal by sampling and converting said FSK signal;
   first delay means for providing a first delayed signal by delaying said sampled signal by a first delay time;
   second delay means for providing a second delayed signal by delaying said sampled signal by a second delay time;
   a multiplier for providing an autocorrelated signal by multiplying said first delayed signal by said second delayed signal;
   a low pass filter for providing a filtered autocorrelated signal by filtering said autocorrelated signal;
   decision logic for recovering data represented by said FSK signal by decoding said filtered autocorrelated signal; and
   selection means for providing a delay selection signal to said first delay means;
   wherein said first delay means provides a first plurality of delay times; and
   said first delay means is responsive to said delay selection signal for providing a selected one of said first plurality of delay times as said first delay time.

9. The apparatus of claim 8 wherein:
   said second delay means provides a second plurality of delay times; and
   said second delay means is responsive to said delay selection signal for providing a selected one of said second plurality of delay times as said second delay time.

10. The apparatus of claim 9 wherein:
    said A/D converter samples and converts said FSK signal at a fixed sampling frequency, FS;
    said first delay time is an integer multiple of 1/FS; and
    said second delay time is a non-integer multiple of 1/FS.

11. The apparatus of claim 10 wherein the difference between said first delay time and said second delay time optimizes recovery of said data represented by said FSK signal.

12. The apparatus of claim 11 wherein said FSK signal comprises a mark signal and a space signal, said filtered autocorrelated signal comprises a filtered autocorrelated mark signal and a filtered autocorrelated space signal, and said difference between said first delay time and said second delay time causes said filtered autocorrelated mark signal to have a value which is the negative of the value of said filtered autocorrelated space signal.

13. The apparatus of claim 8 wherein at least one of said first delay means and said second delay means comprises an interpolating filter.

14. A method for receiving a frequency shift keyed (FSK) signal, said FSK signal comprising a first signal at a first frequency and a second signal at a second frequency, comprising the steps of:
    filtering said FSK signal to provide a filtered FSK signal;
    sampling said filtered FSK signal to provide a sampled signal;
    delaying said sampled signal by a first delay time to provide a first delayed signal;

delaying said sampled signal by a second delay time to provide a second delayed signal;

multiplying said first delayed signal by said second delayed signal to provide an autocorrelated signal;

filtering said autocorrelated signal to provide a filtered autocorrelated signal said step of filtering comprising attenuating said first signal more than said second signal; and decoding said filtered autocorrelated signal to recover data represented by said FSK signal;

wherein the difference between said first delay time and said second delay time is selected to optimize recovery of data represented by said FSK signal.

15. The method of claim 14 wherein said step of filtering comprises bandpass filtering said FSK signal.

16. The method of claim 14 wherein said filtered autocorrelated signal comprises a filtered autocorrelated first signal and a filtered autocorrelated second signal, and the difference between said first delay time and said second delay time is selected to cause said filtered autocorrelated first signal to have a value which is the negative of the value of said filtered autocorrelated second signal.

17. The method of claim 14 wherein said step of sampling comprises sampling at a fixed sampling frequency, FS.

18. The method of claim 17 wherein said first delay time is an integer multiple of 1/FS.

19. The method of claim 18 wherein said second delay time is a non-integer multiple of 1/FS.

20. The method of claim 14 wherein at least one of said steps of delaying said sampled signal comprises using an interpolating filter to provide a delay which is a non-integer multiple of the period of a sampling frequency used to perform said step of sampling.

21. A method for receiving a frequency shift keyed (FSK) signal, comprising the steps of:

sampling said FSK signal to provide a sampled signal;

selecting one of a first plurality of delay times for a first delay time;

delaying said sampled signal by said first delay time to provide a first delayed signal;

delaying said sampled signal by a second delay time to provide a second delayed signal;

multiplying said first delayed signal by said second delayed signal to provide an autocorrelated signal;

filtering said autocorrelated signal to provide a filtered autocorrelated signal; and decoding said filtered autocorrelated signal to recover data represented by said FSK signal.

22. The method of claim 21 and further comprising the step of:

selecting one of a second plurality of delay times for said second delay time.

23. The method of claim 22 wherein:

said step of sampling comprises sampling at a fixed sampling frequency, FS;

said first delay time is an integer multiple of 1/FS; and said second delay time is a non-integer multiple of 1/FS.

24. The method of claim 23 wherein the difference between said first delay time and said second delay time optimizes the recovery of said data represented by said FSK signal.

25. The method of claim 21 wherein at least one of said steps of delaying said sampled signal comprises using an interpolating filter to provide a delay which is a non-integer multiple of the period of a sampling frequency used to perform said step of sampling.

26. An apparatus for receiving a frequency shift keyed (FSK) signal, said FSK signal comprising a first signal at a first frequency and a second signal at a second frequency, comprising filtering means for providing a filtered FSK signal by filtering said FSK signal, said filtering means attenuating said first signal more than said second signal;

an analog-to-digital (A/D) converter for providing a sampled signal by sampling and converting said filtered FSK signal at a fixed sampling frequency, FS;

first delay means for providing a first delayed signal by delaying said sampled signal by a first delay time;

second delay means for providing a second delayed signal by delaying said first delayed signal by a second delay time, the sum of said first delay time and said second delay time being a non-integer multiple of 1/FS;

a multiplier for providing an autocorrelated signal by multiplying said second delayed signal by said sampled signal;

a low pass filter for providing a filtered autocorrelated signal by filtering said autocorrelated signal; and decision logic for recovering data represented by said FSK signal by decoding said filtered autocorrelated signal;

wherein said sum of said first delay time and said second delay time optimizes recovery of data represented by said FSK signal by at least partially compensating for said filtering means.

27. The apparatus of claim 26 wherein said filtering means comprises a bandpass filter.

28. The apparatus of claim 26 wherein said filtered autocorrelated signal comprises a filtered autocorrelated first signal and a filtered autocorrelated second signal, and said sum of said first delay time and said second delay time causes said filtered autocorrelated first signal to have a value which is the negative of the value of said filtered autocorrelated second signal.

29. The apparatus of claim 26 wherein a selected one of said first delay time and said second delay time is an integer multiple of 1/FS.

30. The apparatus of claim 29 wherein the non-selected one of said first delay time and said second delay time is a non-integer multiple of 1/FS.

31. The apparatus of claim 26 wherein at least one of said first delay means and said second delay means comprises an interpolating filter.

32. An apparatus for receiving a frequency shift keyed (FSK) signal, comprising:

an analog-to-digital (A/D) converter for providing a sampled signal by sampling and converting said FSK signal at a fixed sampling frequency, FS;

first delay means for providing a first delayed signal by delaying said sampled signal by a first delay time;

second delay means for providing a second delayed signal by delaying said first delayed signal by a second delay time, the sum of said first delay time and said second delay time being a non-integer multiple of 1/FS;

a multiplier for providing an autocorrelated signal by multiplying said second delayed signal by said sampled signal;

a low pass filter for providing a filtered autocorrelated signal by filtering said autocorrelated signal;

decision logic for recovering data represented by said FSK signal by decoding said filtered autocorrelated signal; and selection means for providing a delay selection signal to said first delay means;

wherein said first delay means provides a first plurality of delay times; and said first delay means is responsive to said delay selection signal for providing a selected one of said first plurality of delay times as said first delay time.

33. The apparatus of claim 32 wherein:

said second delay means provides a second plurality of delay times; and said second delay means is responsive to said delay selection signal for providing a selected one of said second plurality of delay times as said second delay time.

34. The apparatus of claim 33 wherein the sum of said first delay time and said second delay time optimizes recovery of said data represented by said FSK signal.

35. The apparatus of claim 32 wherein at least one of said first delay means and said second delay means comprises an interpolating filter.

36. A method for receiving a frequency shift keyed (FSK) signal, said FSK signal comprising a first signal at a first frequency and a second signal at a second frequency, comprising the steps of:

filtering said FSK signal to provide a filtered FSK signal, said step of filtering comprising attenuating said first signal more than said second signal;

sampling said filtered FSK signal at a fixed sampling frequency, FS, to provide a sampled signal;

delaying said sampled signal by a first delay time to provide a first delayed signal;

delaying said first delayed signal by a second delay time to provide a second delayed signal, the sum of said first delay time and said second delay time being a non-integer multiple of 1/FS;

multiplying said second delayed signal by said sampled signal to provide an autocorrelated signal;

filtering said autocorrelated signal to provide a filtered autocorrelated signal; and decoding said filtered autocorrelated signal to recover data represented by said FSK signal;

wherein the difference between said first delay time and said second delay time is selected to optimize recovery of data represented by said FSK signal.

37. The method of claim 36 wherein said step of filtering comprises bandpass filtering said FSK signal.

38. The method of claim 36 wherein said filtered autocorrelated signal comprises a filtered autocorrelated first signal and a filtered autocorrelated second signal, and the difference between said first delay time and said second delay time is selected to cause said filtered autocorrelated first signal to have a value which is the negative of the value of said filtered autocorrelated second signal.

39. The method of claim 36 wherein a selected one of said first delay time and said second delay time is an integer multiple of 1/FS.

40. The method of claim 39 wherein the non-selected one of said first delay time and said second delay time is a non-integer multiple of 1/FS.

41. The method of claim 36 wherein at least one of said steps of delaying said sampled signal comprises using an interpolating filter to provide a delay which is a non-integer multiple of the period of a sampling frequency used to perform said step of sampling.

42. A method for receiving a frequency shift keyed (FSK) signal, comprising the steps of:

sampling said FSK signal at a fixed sampling frequency, FS, to provide a sampled signal;

delaying said sampled signal by a first delay time to provide a first delayed signal;

selecting one of a first plurality of delay times for said first delay time;

delaying said first delayed signal by a second delay time to provide a second delayed signal, the sum of said first delay time and said second delay time being a non-integer multiple of 1/FS;

selecting one of a second plurality of delay times for said second delay time;

multiplying said second delayed signal by said sampled signal to provide an autocorrelated signal;

filtering said autocorrelated signal to provide a filtered autocorrelated signal; and decoding said filtered autocorrelated signal to recover data represented by said FSK signal.

43. The method of claim 42 wherein at least one of said steps of delaying said sampled signal comprises using an interpolating filter to provide a delay which is a non-integer multiple of the period of a sampling frequency used to perform said step of sampling.

44. A modem receiver for receiving frequency shift keyed (FSK), phase shift keyed (PSK), and phase and amplitude modulated (PAM) signals, comprising:

first filtering means for providing a filtered signal by filtering said FSK, PSK, and PAM signals;

an analog-to-digital (A/D) converter for providing a sampled signal by sampling and converting said filtered signal;

a demodulator for demodulating said PSK and PAM signals to provide in-phase (I) and quadrature phase (Q) signals;

a first interpolating filter, responsive to a first predetermined one of said I and Q signals for providing a first interpolated signal when said modem receiver is operating in a PSK mode or a PAM mode, and for providing a first delayed signal by delaying said sampled signal by a first delay time when said modem receiver is operating in an FSK mode;

a second interpolating filter, responsive to a second predetermined one of said I and Q signals for providing a second interpolated signal when said modem receiver is operating in said PSK mode or said PAM mode;

delay means for providing a second delayed signal by delaying said sampled signal by a second delay time when said modem receiver is operating in said FSK mode;

adaptive equalizer means responsive to said first interpolated signal and said second interpolated signal for providing an equalized signal and equalization coefficients;

filter control means responsive to said equalization coefficients for controlling the operation of said first interpolating filter and said second interpolating filter when said modem receiver is operating in said PSK mode or said PAM mode;

multiplier means for providing an autocorrelated signal by multiplying said first delayed signal by said second delayed signal;

second filtering means for providing a filtered autocorrelated signal by filtering said autocorrelated signal;

decision logic means, responsive to said equalized signal for recovering data represented by said PSK signal when said modem receiver is in said PSK mode, responsive to said equalized signal for recovering data represented by said PAM signal when said modem receiver is in said PAM mode, and responsive to said filtered autocorrelated signal for recovering data represented by said FSK signal when said modem receiver is in said FSK mode; and control means for causing said modem receiver to operate in a selected one of said FSK mode, said PSK mode, or said PAM mode.

45. The modem receiver of claim 44 wherein said second filtering means is a low pass filter.

46. The modem receiver of claim 44 wherein said A/D converter samples and converts said filtered signal at a fixed sampling frequency, FS.

47. The modem receiver of claim 46 wherein said first delay time is a non-integer multiple of 1/FS.

48. The modem receiver of claim 47 wherein said second delay time is an integer multiple of 1/FS.

49. The modem receiver of claim 48 wherein the difference between said first delay time and said second delay time optimizes recovery of data represented by said FSK signal.

50. The modem receiver of claim 44 and further comprising:

selection means for providing a delay selection signal;

wherein said first interpolating filter provides a first plurality of delay times and is responsive to said delay selection signal for providing a selected one of said first plurality of delay times as said first delay time; and said delay means provides a second plurality of delay times and is responsive to said delay selection signal for providing a selected one of said second plurality of delay times as said second delay time.

51. The modem receiver of claim 50 wherein:

said A/D converter samples and converts said filtered signal at a fixed sampling frequency, FS;

said first delay time is a non-integer multiple of 1/FS; and said second delay time is an integer multiple of 1/FS.

52. The modem receiver of claim 51 wherein the difference between said first delay time and said second delay time optimizes recovery of data represented by said PSK signal.

53. The modem receiver of claim 44 wherein said first filtering means is a bandpass filter.

54. The modem receiver of claim 44 wherein said FSK signal comprises a first signal at a first frequency and a second signal at a second frequency, said first filtering means attenuates said first signal more than said second signal, and the difference between said first delay time and said second delay time optimizes recovery of data represented by said FSK signal.

55. The modem receiver of claim 54 wherein said filtered autocorrelated signal comprises a filtered autocorrelated first signal and a filtered autocorrelated second signal, and the difference between said first delay time and said second delay time causes said filtered autocorrelated first signal to have a value which is the negative of the value of said filtered autocorrelated second signal.

56. The modem receiver of claim 44 wherein:

said second filtering means provides a predetermined number of samples of said filtered autocorrelated signal per unit of time;

said second interpolating filter is interposed between said second filtering means and said decision logic means and said second interpolating filter increases the number of samples per unit of time of said filtered autocorrelated signal provided to said decision logic means.

57. The modem receiver of claim 56 wherein said second interpolating filter doubles said number of samples per unit of time.

58. A modem receiver for receiving frequency shift keyed (FSK), phase shift keyed (PSK), and phase and amplitude modulated (PAM) signals, comprising:

first filtering means for providing a filtered signal by filtering said FSK, PSK, and PAM signals;

an analog-to-digital (A/D) converter for providing a sampled signal by sampling and converting said filtered signal;

a demodulator for demodulating said PSK and PAM signals to provide in-phase (I) and quadrature phase (Q) signals;

a first interpolating filter, responsive to a first predetermined one of said I and Q signals for providing a first interpolated signal when said modem receiver is operating in a PSK mode or a PAM mode, and for providing a delayed signal by delaying said sampled signal for a first delay time when said modem receiver is operating in said FSK mode;

a second interpolating filter, responsive to a second predetermined one of said I and Q signals for providing a second interpolated signal when said modem receiver is operating in said PSK mode or said PAM mode;

delay means for providing said delayed signal by delaying said sampled signal for a second delay time when said modem receiver is operating in said FSK mode, said delay means being connected in series with said first interpolating filter for providing a net delay time, said net delay time being the sum of said first delay time and said second delay time;

adaptive equalizer means responsive to said first interpolated signal and said second interpolated signal for providing an equalized signal and equalization coefficients;

filter control means responsive to said equalization coefficients for controlling the operation of said first interpolating filter and said second interpolating filter when said modem receiver is operating in said PSK mode or said PAM mode;

multiplier means for providing an autocorrelated signal by multiplying said sampled signal by said delayed signal;

second filtering means for providing a filtered autocorrelated signal by filtering said autocorrelated signal;

decision logic means, responsive to said equalized signal for recovering data represented by said PSK signal when said modem receiver is in said PSK mode, responsive to said equalized signal for recovering data represented by said PAM signal when said modem receiver is in said PAM mode, and responsive to said filtered autocorrelated signal for recovering data represented by said FSK signal when said modem receiver is in said FSK mode; and control means for causing said modem receiver to operate in a selected one of said FSK mode, said PSK mode, or said PAM mode.

59. The modem receiver of claim 58 wherein said second filtering means is a low pass filter.

60. The modem receiver of claim 58 wherein said A/D converter samples and converts said filtered signal at a fixed sampling frequency, FS.

61. The modem receiver of claim 60 wherein said first delay time is a non-integer multiple of 1/FS.

62. The modem receiver of claim 61 wherein said second delay time is an integer multiple of 1/FS.

63. The modem receiver of claim 62 wherein the sum of said first delay time and said second delay time optimizes recovery of data represented by said FSK signal.

64. The modem receiver of claim 58 and further comprising:

selection means for providing a delay selection signal;

wherein said first interpolating filter provides a first plurality of delay times and is responsive to said delay selection signal for providing a selected one of said first plurality of delay times as said first delay time; and said delay means provides a second plurality of delay times and is responsive to said delay selection signal for providing a selected one of said second plurality of delay times as said second delay time.

65. The modem receiver of claim 64 wherein:

said A/D converter samples and converts said filtered signal at a fixed sampling frequency, FS;

said first delay time is a non-integer multiple of 1/FS; and said second delay time is an integer multiple of 1/FS.

66. The modem receiver of claim 65 wherein the sum of said first delay time and said second delay time optimizes recovery of data represented by said PSK signal.

67. The modem receiver of claim 58 wherein said first filtering means is a bandpass filter.

68. The modem receiver of claim 58 wherein said FSK signal comprises a first signal at a first frequency and a second signal at a second frequency, said first filtering means attenuates said first signal more than said second signal, and the sum of said first delay time and said second delay time optimizes recovery of data represented by said FSK signal.

69. The modem receiver of claim 68 wherein said filtered autocorrelated signal comprises a filtered autocorrelated first signal and a filtered autocorrelated second signal, and the sum of said first delay time and said second delay time causes said filtered autocorrelated first signal to have a value which is the negative of the value of said filtered autocorrelated second signal.

70. The modem receiver of claim 58 wherein:

said second filtering means provides a predetermined number of samples of said filtered autocorrelated signal per unit of time;

said second interpolating filter is interposed between said second filtering means and said decision logic means and said second interpolating filter increases the number of samples per unit of time of said filtered autocorrelated signal provided to said decision logic means.

71. The modem receiver of claim 70 wherein said second interpolating filter doubles said number of samples per unit of time.

* * * * *

UNITED STATES PATENT AND TRADEMARK OFFICE
CERTIFICATE OF CORRECTION

PATENT NO. : 5,040,192
DATED : Aug. 13, 1991
INVENTOR(S) : Taruna Tjahjadi It is certified that error appears in the above-identified patent and that said Letters Patent is hereby corrected as shown below:

In column 7, line 22, of the patent, following the term "frequency", please insert --,--.

In column 7, line 24, of the patent, following the term "signal", please insert --,--.

In column 9, line 6, of the patent, following the term "signal", please insert --,--.

In column 10, line 9, of the patent, please delete ":" and substitute --;--

In column 12, line 5, of the patent, please delete ";" and substitute --:--

Signed and Sealed this

Sixth Day of April, 1993

*Attest:*

STEPHEN G. KUNIN

*Attesting Officer*     *Acting Commissioner of Patents and Trademarks*